United States Patent [19]
Bills

[11] Patent Number: 6,081,121
[45] Date of Patent: Jun. 27, 2000

[54] IONIZATION GAUGE AND METHOD OF USING AND CALIBRATING SAME

[75] Inventor: Daniel Granville Bills, Boulder, Colo.

[73] Assignee: Helix Technology Corporation, Mansfield, Mass.

[21] Appl. No.: 09/010,484

[22] Filed: Jan. 21, 1998

[51] Int. Cl.[7] .................................................. G01L 21/32
[52] U.S. Cl. ........................................ 324/460; 324/462
[58] Field of Search ..................................... 321/459, 460, 321/462, 463, 468, 470; 313/111.91; 315/362.1, 363.1; 73/1.02, 708; 250/423 R, 427, 252.1

[56] References Cited

U.S. PATENT DOCUMENTS

| | | | |
|---|---|---|---|
| 4,468,968 | 9/1984 | Kee ......................................... | 364/558 |
| 4,866,640 | 9/1989 | Morrison, Jr. ............................ | 364/558 |
| 5,128,617 | 7/1992 | Bills ........................................ | 324/459 |
| 5,250,906 | 10/1993 | Bills et al. ............................... | 324/462 |
| 5,296,817 | 3/1994 | Bills et al. ............................... | 324/460 |
| 5,422,573 | 6/1995 | Bills et al. ............................... | 324/460 |
| 5,801,535 | 9/1998 | Bills ........................................ | 324/462 |

*Primary Examiner*—Diep N. Do
*Attorney, Agent, or Firm*—Hamilton, Brook, Smith & Reynolds

[57] ABSTRACT

Controller circuitry and method for controlling the operation of an ionization gauge having a source of electrons, an anode, an ion collector electrode. Circuitry is provided (a) for providing an electron emission current from the electron source (b) for measuring the heating power $W_X$ of the electron source to obtain a measured value of the heating power at an unknown pressure $P_X$ and (c) measuring the ion current to the collector electrode to obtain a measured value of the positive ion current $i_{+X}$ at the unknown pressure. A memory is also provided for storing at least one equation for pressure, the pressure equation being obtained from a reference gauge by measuring the current $i_{+cal}$ to the positive ion collector electrode, the electron emission current $i_{-cal}$ from the electron source and the heating power $W_{cal}$ of the electron source of the reference gauge at selected calibration pressures $P_{cal}$ and selected heating powers $W_{cal}$ of the electron source of the reference gauge, the equation for pressure being in the form of $P=f(i_+/i_-,W)$. Moreover, a calculator responsive to the stored equation for pressure and the measured values of positive ion collector current $i_{+X}$ and heating power $W_X$ of the electron source is provided for calculating a pressure indication $P_{XI}$ when the predetermined pressure gauge is exposed to the unknown pressure $P_x$ at an emission current $i_{-cal}$ of the electron source, the pressure indication being calculated according to the equation $P_{XI}=f(i_{+X}/i_{-cal}, W_X)$. Means are also provided such that, for a given pressure of the gas and cathode temperature, the temperature of the internal surfaces of the gauge will be substantially repeatable over time and reproducible gauge to gauge.

5 Claims, 3 Drawing Sheets

IONIZATION GAUGE AND METHOD OF USING AND CALIBRATING SAME

RELATED PATENTS

This application is related to U.S. Pat. Nos. 5,128,617; 5,250,906; 5,296,817; and 5,422,573, all of which are assigned to the assignee of the present application and all of which are incorporated herein by reference.

BACKGROUND OF THE INVENTION

1. Field of the Invention

The present invention relates to means and a method for accurately measuring pressure with a hot cathode ionization gauge.

2. Discussion of Prior Art

Prior art hot cathode ionization gauges are calibrated by measuring the current $i_{+cal}$ to the ion collector electrode, at a fixed known value of electron emission current $i_{+cal}$, at known pressures $P_{cal}$, in the calibration system. A gauge sensitivity S is then defined where $$S = \frac{i_{+cal}}{i_{-cal} P_{cal}} \quad (1)$$

In order to measure an unknown pressure $P_X$ in a vacuum system, the current $i_{+X}$ to the ion collector electrode is measured using an emission current value of $i_{-cal}$. It is then assumed that the unknown pressure $P_X$ can be calculated using Eq. 2.

$$P_X = \frac{i_{+X}}{i_{-cal} S} \quad (2)$$

It has long been recognized that Eq. 2 does not give accurate results but surprisingly little has been done to improve the accuracy of measurement.

The root cause of the problem with accuracy is that because of historical precedent, ionization gauges are calibrated in units of pressure whereas all ionization gauges measure gas density. Under conditions of thermal equilibrium, pressure P and gas density n are simply related by Eq. 3.

$$P = nkT \quad (3)$$

where k is the Boltzmann constant, and T is the absolute temperature of the gas. However, pressure and density are not simply related variables in a hot cathode ionization gauge because conditions for thermal equilibrium are not present in an operating hot cathode ionization gauge and an absolute temperature cannot be defined.

It is instructive to examine in some detail why Eq. 2 does not give accurate results.

If Eq. 1 is substituted into Eq. 2, the result is $$P_X = \frac{i_{+X}}{i_{-cal}\left[\frac{i_{+cal}}{i_{-cal} P_{cal}}\right]} = \frac{i_{+X}}{i_{+cal}} P_{cal} \quad (4)$$

The conventional way of interpreting this result is that when $$i_{+X} = i_{+cal} \quad (5)$$

then Eq. 6 must hold.

$$P_X = P_{cal} \quad (6)$$

This interpretation is the basis for known prior art hot cathode ionization gauge calibrations. However, Eq. 4 also implies that if Eq. 6 holds then Eq. 5 must hold. Because the ion collector current in a hot cathode gauge is a function of the gas density n, from Eq. 5 we must have $$n_X = n_{cal} \quad (7)$$

Here, $n_X$ is the number of gas molecules per unit volume in the gauge at the unknown pressure $P_X$ and $n_{cal}$ is the number per unit volume present in the gauge when the calibration pressure was $P_{cal}$.

If the interior surfaces of the gauge exposed to the ion collection volume are not at substantially the same temperature during measurement of $P_X$ as during calibration at $P_{cal}$, then the gas molecules incident on the surfaces will have different average kinetic energy when they leave the surfaces, therefore, different average velocity during measurement than was present during calibration. Therefore, the transit time for gas molecules through the ion collection volume will not be the same during measurement of $P_X$ as during calibration. If the transit times are not the same, then the number of molecules per unit volume which are present will not be the same and Eq. 7 is not satisfied.

For Eq. 7 to be satisfied requires that the average energy of the gas molecules in the ion collection volume during measurement of an unknown pressure $P_X$ be substantially the same as that prevailing during calibration at substantially the same pressure. If the average energy is different, then Eq. 7 is not satisfied.

There is considerable prior art on how to correct pressure measuring transducers for the effects of temperature changes. See, for example, U.S. Pat. No. 4,468,968 wherein it is taught how to correct for the effects of temperature change on the transducer elements per se but not on changes in the medium being measured. In a hot cathode ionization gauge ambient temperature changes have negligible effect on the performance of the gauge itself but can have substantial effects on the gaseous medium being measured and, therefore, on the output of the ionization gauge.

In U.S. Pat. No. 4,866,640, Morrison teaches that the effect of a different gas temperature during use than was present during calibration of a hot cathode ionization gauge can be corrected for from gas temperature measurements. The ratio of the absolute gas temperature, $T_{cal}$, measured during calibration divided by the absolute gas temperature, $T_{use}$, measured during use is multiplied by the value of gauge sensitivity, $S_{cal}$, obtained during calibration to obtain a corrected value of gauge sensitivity, $S_{use}$. See Eq. 16 in Morrison.

A fundamental error in the teachings of Morrison in U.S. Pat. No. 4,866,640 is the assumption that an absolute gas temperature can be defined in a hot cathode ionization gauge. The gas temperature as used by Morrison can only be defined for conditions of thermal equilibrium. However, thermal equilibrium is not present in a hot cathode gauge where there is net heat flow between numerous parts.

Another error is the assumption that a gas temperature can be measured practically in a hot cathode gauge. Although Morrison specifies a gas temperature measuring element, there is no teaching of how the gas temperature can be measured at the low pressures of interest where the mass of all the gas in the gauge is orders of magnitude below that of any known temperature sensor. For example, at $1\times10^{-10}$ Torr the total mass of gas in a gauge is only of the order of $10^{-14}$ gram. An equal mass of tungsten would have a volume of approximately $10^{-15}$ cm$^3$. The heat content of all of the gas in the gauge at low pressure is orders of magnitude less than that in the smallest gauge part and will have no effect on a practical gas temperature sensor.

Morrison also ignores the presence of radiated energy from the incandescent cathode. All surfaces within a hot cathode gauge are bathed in radiant energy from the hot cathode which will affect the temperature of any gas temperature sensor many orders of magnitude greater than will the relatively few gas molecules present at low pressure. For this further reason, gas temperature cannot be measured in a hot cathode ionization gauge in a practical way.

Another error is that Eq. 3 applies in a hot cathode ionization gauge. Equation 3 above holds only under conditions of thermal equilibrium and thus Morrison is in error in using this simple relationship between pressure and temperature in a hot cathode ionization gauge where thermal equilibrium does not exist.

In U.S. Pat. No. 5,250,906 where one of the inventors is the present applicant, claim 8 thereof recites, inter alia, that a reference gauge used during calibration has the same sensitivity at any given pressure and cathode heating power as a predetermined gauge used to measure unknown pressure.

However, applicant has found numerous instances in which the reference gauge had substantially the same sensitivity at any given pressure and cathode heating power as did the predetermined gauge at one time and not at other times. Thus, U.S. Pat. No. 5,250,906 does not teach how to cause the predetermined gauge to behave consistently like the reference gauge or vice versa.

The concept of gauge sensitivity S has been universally used in prior art gauge calibration methods with and without corrections to S for changes in surface temperatures within the gauge. Applicant has discovered that S is a complicated function of the temperature and area of the surfaces exposed to the gas in an ionization gauge and, therefore, is not an appropriate parameter for use in accurate pressure measurement.

Furthermore, applicant has found a new method of calibrating hot cathode ionization gauges which completely avoids the use of the concept of gauge sensitivity and any need to measure gas temperature, therefore, avoids the complications introduced into pressure measurement when S changes.

SUMMARY OF THE INVENTION

The present invention consists of apparatus and a method for accurately measuring pressure with an ionization gauge.

The apparatus consists of an ionization gauge such as described in U.S. Pat. No. 5,128,617 wherein the path lengths of the electrons emitted from the cathode have purposely been made substantially repeatable over time in the same gauge and reproducible gauge to gauge and wherein all heat flow paths and surface emissivities have purposely been mode substantially repeatable within a given gauge and reproducible gauge to gauge, plus means for conventionally operating the gauge, plus means for measuring cathode heating power, plus means for storing one or more equations, plus means for calculating an unknown pressure from measurements of the ion collector current, emission current, and cathode heating power.

The equation(s) is of the form $$P = f(i_+/i_-, W) \qquad (8)$$

where $i_+$ is the positive ion current to the ion collector electrode $i_-$ is the emission current W is the cathode heating power Equation 8 is obtained by measuring $i_{+cal}$, $i_{-cal}$, and $W_{cal}$ at a series of known calibration pressures $P_{cal}$ and heating powers. The heating power required to give a constant emission current $i_{cal}$ can be caused to vary by introducing small amounts of oxygen or otherwise contaminating the cathode which serves to raise the work function of the cathode. This calibration data is plotted in three dimensions using readily available three dimensional plotting software to obtain a best fit equation for the calibration data. Equation 8 is stored in ionization gauge controller memory. An unknown pressure can then be measured with the calibrated gauge simply by measuring $i_{+X}$, $i_{cal}$, and $W_X$, substituting in Eq. 8 and calculating a pressure indication $P_{XI}$ corresponding to the unknown pressure $P_X$.

DETAILED DESCRIPTION OF THE PREFERRED EMBODIMENTS OF THE INVENTION

Figure 1:
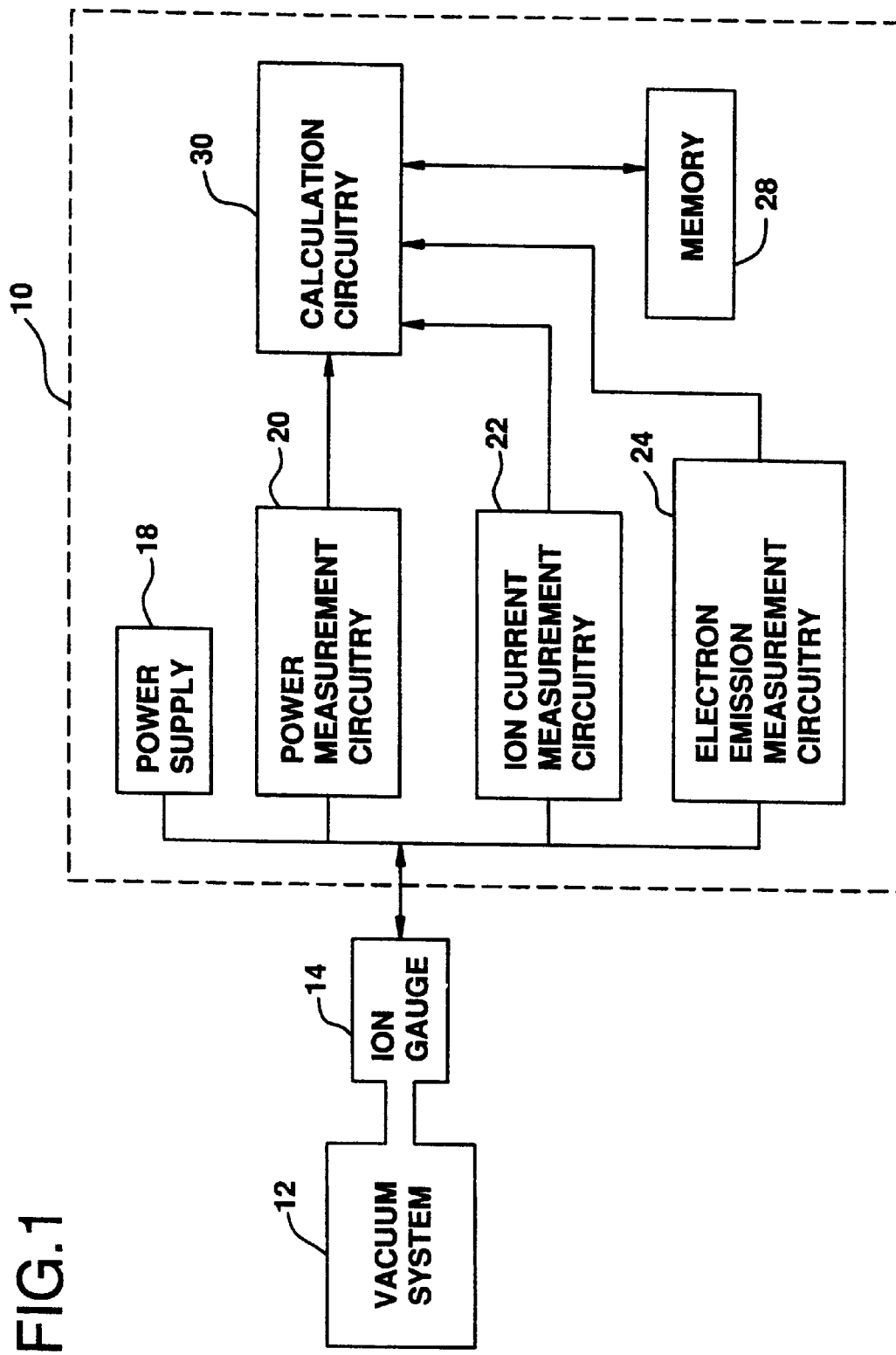
FIG. 1 is a block diagram of illustrative apparatus for measuring gas pressure with an ionization gauge wherein an improved calibration technique in accordance with the invention may be utilized.

Reference should be made to the figures where like reference numerals refer to like parts.

In FIG. 1 is shown apparatus 10 for measuring gas pressure accurately with an ionization gauge. The ionization gauge 14 is attached to a vacuum system 12 whose pressure is to be measured. The ionization gauge 14 is of a stable design such as described in U.S. Pat. Nos. 5,128,617; 5,250,906; 5,296,817; or 5,422,573 with improvements as described below. Gauge 14 is operated in a conventional manner by a power supply 18 which supplies well-controlled bias voltages to the anode and cathode of the gauge together with well-controlled power to heat the cathode to the temperature required to obtain the desired electron emission. The cathode heating power is measured by the power measurement circuitry 20. The cathode heating power may also be calculated from the cathode voltage and current as described in U.S. Pat. No. 5,250,906. The current to the ion collector electrode of gauge 14 is measured by ion current measurement circuitry 22. The electron emission current from the cathode in gauge 14 may be measured by electron emission current measurement circuitry 24 or may be a parameter entered by the user as described in U.S. Pat. No. 5,250,906.

The cathode power signal W from measurement circuitry 20 is fed into calculation circuitry 30 together with the $i_+$ signal from measurement circuitry 22 plus the $i_-$ signal from measurement circuitry 24.

Equation 8 is stored in the memory 28 for use in calculating pressure indications $P_I$ which are output by the calculation circuitry 30. Equation 8 may be obtained for a given ionization gauge 14 as follows. A reference gauge is attached to a conventional vacuum calibration system and calibrated at a series of known calibration pressures $P_{cal}$ under very clean conditions as is well-known in the art. With very clean conditions existing in the gauge, cathode heating power is minimal. The current, $i_{+cal}$, to the ion collector is measured and recorded at constant emission current, $i_{+cal}$ for each selected pressure. In addition, the cathode heating power $W_{cal}$ is measured and recorded for each selected pressure. Then this calibration process is repeated multiple times with higher cathode heating powers. Higher cathode power can be achieved by briefly exposing the hot cathode to a minute amount of a contaminating gas such as oxygen. As described in U.S. Pat. No. 5,250,906, it is well known that traces of oxygen raise the work function of the emitting surface. After oxygen contamination, a higher cathode temperature is required to achieve the desired emission current. A higher cathode temperature requires increased cathode heating power.

The data sets for each cathode power selection are then used to generate a three dimensional surface which best fits the data using commercially available software. In some cases, a better fit can be obtained if the pressure range is divided up so that multiple equations result. The equation(s) 8 is stored in memory 28 for later use.

To use a gauge 14 to measure an unknown gas pressure where gauge 14 may correspond to either (a) a gauge calibrated as described above or (b) a non-calibrated gauge, the gauge 14 is attached to the vacuum system 12 where the gas pressure is to be measured as is well-known in the art. At an unknown pressure $P_X$ in the system, the current $i_{+X}$ to the ion collector electrode is measured together with the fixed emission current $i_{-cal}$ and the cathode heating power $W_X$. The signals $i_{+X}$, $i_{-cal}$ and $W_X$ are sent to the calculation circuitry 30. Equation 8 is also sent to calculation circuitry 30 from memory block 28. In the calculation circuitry 30, these signals are used in Eq. 8 to calculate an indicated pressure signal $P_{IX}$ which closely corresponds to the unknown pressure $P_X$.

The foregoing calibration technique can be utilized in accordance with the present invention with non-calibrated gauges because the interior surfaces of the gauge exposed to the ion collection volume are at substantially the same temperature during measurement of the unknown pressure as are the interior surfaces of the reference gauge during calibration at the calibration pressures. Thus, the average energy of the gas to molecules in the ion collection volume during measurement of the unknown pressure is substantially the same as that prevailing during calibration at substantially the same calibration pressure. This, as will be described in further detail below with respect to FIGS. 3a through 3d, can be implemented by making all heat flow paths and surface emissivities substantially repeatable within a given gauge and reproducible from gauge to gauge. Thus, the heat flow paths and surface emissivities in the reference gauge used during calibration and the predetermined gauge used to effect measurement of the unknown pressure are substantially the same. Moreover, the path lengths of the electrons emitted from the cathode are preferably made substantially repeatable over time in the same gauge and the reproducible gauge to gauge, as describe in U.S. Pat. No. 5,128,617.

In general, applicant has discovered that in an ionization gauge, if the heat flow paths from electrodes to supports, from supports to vacuum enclosure, from shield to vacuum enclosure, from enclosure to system, etc., (where the latter elements are known and illustrated in U.S. Pat. Nos. 5,128,617 and 5,250,906, for example) are made repeatable over time in the same gauge and reproducible gauge to gauge, considerable benefits can be gained. Although in U.S. Pat. No. 5,128,617, the need to maintain stable geometry and electron paths is taught to achieve long term accuracy and reproducible behavior gauge to gauge, the need to maintain stable heat flow within a given gauge and reproducibility gauge to gauge has not been previously recognized. This fact is understandable because the additional accuracy provided by stable heat flow paths would have been unrecognizable in the presence of the large error in pressure indication in ion gauges before the teachings of U.S. Pat. No. 5,128,617 were implemented.

Figure 2A:
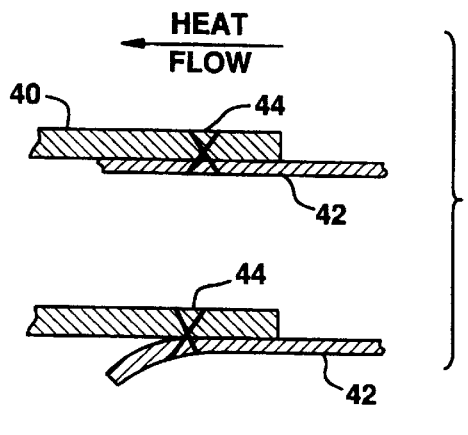
FIGS. 2a–2f are schematic diagrams of illustrative joints between prior art gauge parts.

In FIGS. 2a through 2f are shown illustrations of typical prior art joints including spot welds 44 indicated by an "X". In FIG. 2a there are illustrated joints between gauge elements 40 and 42 where the contact area is variable and changes with time. In particular, due to repeated heating and cooling of the joint between elements 40 and 42, the element 42 tends to peel from the element 40 as illustrated in the lower portion of FIG. 2a. Thus, the contact area between elements 40 and 42 varies with time whereby a stable heat flow within a given gauge and reproducibility from gauge to gauge can not be maintained.

With respect to FIGS. 2a through 2d, it should be noted that element 42 may, for example, correspond to the cathode filament or to an electrode such as the anode or ion collector while element 40 may correspond to one of the supports for these elements. Alternatively, element 42 may correspond to one of the supports for the foregoing elements while element 40 corresponds to a pin or the like disposed in the vacuum enclosure of the gauge where in the latter instance, the elements 40 and 42 would be more approximately equal in size.

Further, it should be noted that the heat flow direction illustrated in FIG. 2a corresponds to the heat flow direction found in ionization gauges where heat is conducted from the gauge elements 40 or 42 to the system. As can be appreciated, with peeling of gauge element 42 with respect to gauge element 40, the contact area between these elements varies thus effecting the heat flow between these elements and thus changing the temperature distribution on the interior surfaces of the gauge.

Figure 3A:
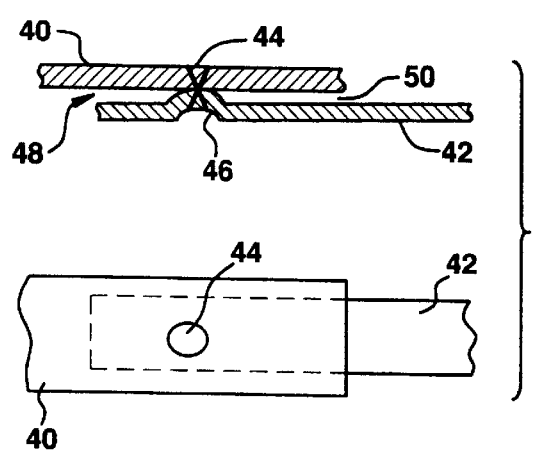
FIGS. 3a–3c are schematic diagrams of preferred joints between gauge parts in accordance with the invention.

Referring to FIG. 3a, there is illustrated a technique in accordance with the invention to avoid the problem introduced when element 42 peels with respect to element 40 or vice versa. In particular, as shown in the upper portion of FIG. 3a, element 42 (or element 40) may be provided with a protrusion or bump 46 whereby the contact area between elements 40 and 42 is minimized such that spacings 48 and 50 occur between elements 40 and 42. With the minimization of the contact area provided by bump 46, the tendency of the elements to peel with respect to one another is substantially lessened. As can be seen from FIGS. 3a and 3b, spot weld 44 is provided at the bump to effect the joint between elements 40 and 42 where the lower portion of FIG. 3a shows the elements 40 and 42 and spot weld 44 in plan view.

Figure 2B:
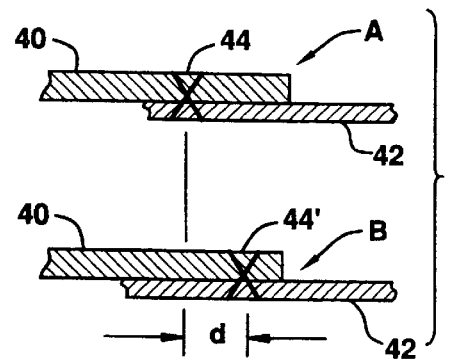

Referring to FIG. 2b, there is illustrated another problem which occurs in prior art gauges wherein the heat flow path length is not maintained constant, the heat flow path length being the entire length of the heat path including, for example, (a) the cathode filament, its supports, and the vacuum enclosure pins to which its supports are connected; (b) the anode, its supports, and the enclosure pins to which its supports are connected; or (c) the ion collector electrode, its supports, and the enclosure pins to which its supports are connected where again the latter elements are well known in the art.

As can be seen in FIG. 2b, the spot weld 44 for a gauge A illustrated in the upper portion of FIG. 2b is at a different location than the spot weld 44' for the gauge B illustrated in the lower part of FIG. 2b where the gauge A, for example, may correspond to the reference gauge used during calibration and the gauge B may correspond to a non-calibrated gauge used to measure an unknown system gas pressure or gauges A and B may both be non-calibrated gauges. These different positions of the spot welds 44 and 44' are indicated as a difference in the heat flow path lengths of the gauges A and B. Again, this difference in heat flow path length will affect the temperature distribution on the surfaces of the gauge elements 40 and 42 such that the temperature distribution on the surfaces of these elements will be different for gauge A compared to the temperature distribution on the surfaces of these elements of gauge B.

Figure 3B:
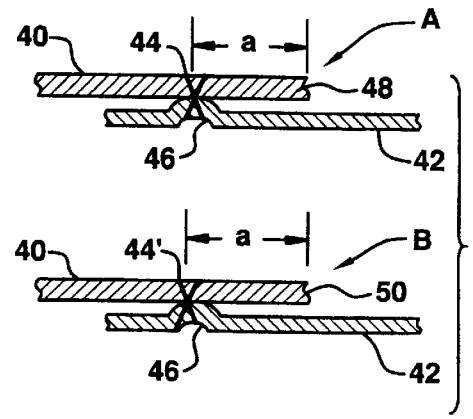

The foregoing problem can be overcome, as illustrated in FIG. 3b, by insuring that the spot welds 44 and 44' which connect the elements 40 and 42 of the upper and lower gauges of FIG. 3b are located the same distance a from the ends 48 and 50 of the gauge element 40 of the gauges A and B. Moreover, the bumps 46 will also be located the same distance from the ends 48 and 50 of the gauge elements 40. Hence, in the foregoing manner, stability of heat flow paths is further provided.

Figure 2C:
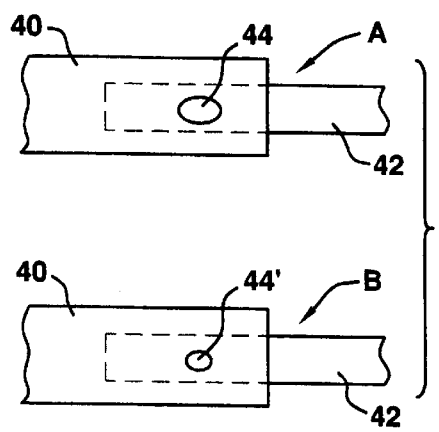

Referring to FIG. 2c, there is illustrated a further problem with prior art gauges in that the size of the spot weld utilized in gauge A is different from that utilized in gauge B and this difference in contact area of the spot welds 44 and 44' will further contribute to instability of the heat flow paths in the gauge.

Figure 2D:
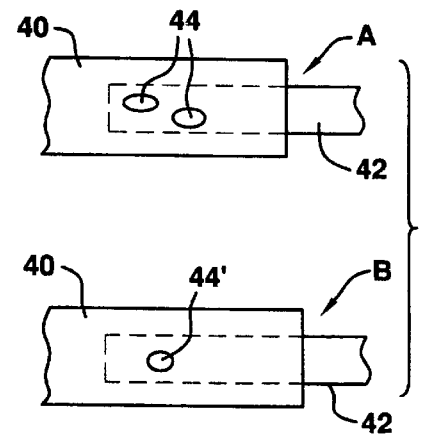

Moreover, referring to FIG. 2d, the number of spot welds 44 utilized in gauge A differs from the number utilized in gauge B and thus again the heat flow area has not been maintained constant due to a difference in the contact areas of the spot welds. These differences in the contact areas of the spot welds, as illustrated in FIGS. 2c and 2d, again result in the inability to maintain stable heat flow within a given gauge and reproducability gauge to gauge. This problem is overcome in the present invention, as illustrated in FIGS. 3a and 3b, where a single spot weld 44 may be employed and where the size of the spot weld is the same for both gauges A and B.

Figure 2E:
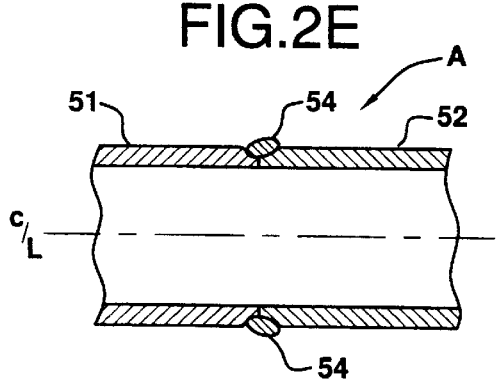
Figure 2F:
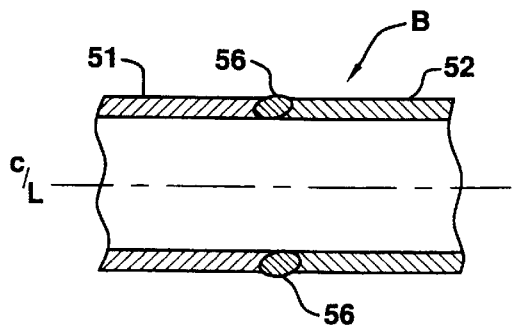
Figure 3C:
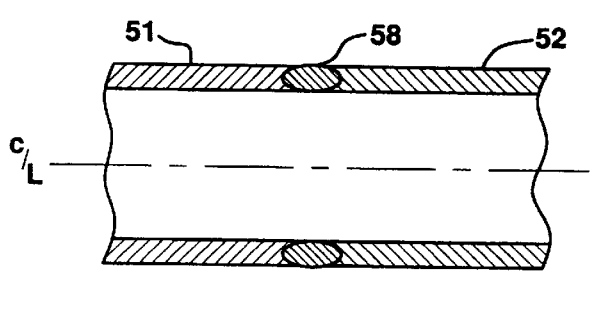

Referring to FIGS. 2e and 2f, there are illustrated gauge elements 51 and 52 of gauges A and B where the element 51 may correspond to the shield illustrated as element 12 in U.S. Pat. No. 5,250,906 and the element 52 may correspond to the vacuum enclosure 24 illustrated in the foregoing patent. The element 51 is typically connected to element 52 where differences in contact area between elements 51 and 52 in gauges A and B result due to the differing amounts of penetration of weld beads 54 and 56, as can be seen in FIGS. 2e and 2f. This problem can be overcorme as illustrated in FIG. 3c where there is a complete penetration of the weld bead 58 in all gauges and thus the contact area between elements 51 and 52 is maintained constant within a given gauge and is reproducible from gauge to gauge.

Figure 3D:
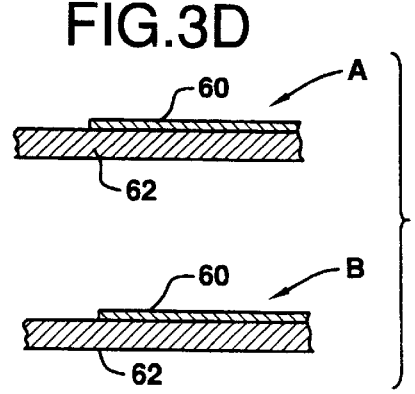
FIG. 3d is a schematic diagram which illustrates preferred electron emissive surfaces gauge to gauge in accordance with the invention.

Another problem with respect to prior art gauges is that the emissivity of the hot cathode is not reproducible from gauge to gauge because the area covered by the cathode coating is not reproducible from gauge to gauge. Referring to FIG. 3d, there are illustrated cathode coatings covering substantially the same areas of the cathodes. In particular cathode coatings 60 of gauges A and B cover substantially equal surface areas of the filament wires 62 and thus the emissivities of the hot cathodes of gauges A and B are substantially the same. Again, this also results in stable heat flow paths which are reproducible from gauge to gauge.

By implementing one or more of the features of FIGS. 3a through 3d, steps can be taken to effectively assure that, for a given pressure of the gas and cathode temperature, the temperature of the internal surfaces of the gauge will be substantially the same over time and from gauge to gauge. If the internal surface temperatures are repeatable over time and reproducible from gauge to gauge at any given pressure and cathode temperature, then the average energy of the molecules, the gas density and, therefore, $i_+/i_-$ will be repeatable and reproducible. If $i_+/i_-$ is repeatable and reproducible then the pressure indication $P_I$ will be repeatable and reproducible.

What is claimed is:

1. An ionization gauge comprising gauge elements including:

a source of electrons;

an open anode defining an anode volume; and a collector electrode for collecting ions formed by impact between said electrons and gas molecules within said anode volume so that the pressure of the gas can be measured to provide a measurement output of the cauge;

where at least one of the gauge elements includes a protuberance where the gauge element is spot welded to another gauge element such that contact between the gauge elements occurs substantially only at said protuberance.

2. An ionization gauge as in claim 1, where a first member of the pair of spot-welded gauge elements is the anode, electron source, or collector electrode and a second member of the pair of spot-welded gauge elements is a respective support for the first member.

3. A plurality of ionization gauges, each comprising gauge elements including:

a source of electrons, an open anode defining an anode volume; and a collector electrode for collecting ions formed by impact between said electrons and gas molecules within said anode volume so that the pressure of the gas can be measured to provide a measurement output of the gauge;

where at least one of the gauge elements includes a protuberance where the gauge element is spot welded to another gauge element such that contact between the gauge elements occurs substantially only at said protuberance.

4. A plurality of ionization gauges as in claim 3, where the distance of the spot weld from the end of one of said gauge elements of one of said gauges is substantially the same distance as the location of the spot weld from the end of the corresponding one of said gauge elements of another one of said gauges.

5. A plurality of ionization gauges having respective spot welds as in claim 3, where the sizes of said respective spot welds are substantially the same.

* * * * *